(12) United States Patent
Holzinger et al.

(10) Patent No.: US 12,436,238 B2
(45) Date of Patent: Oct. 7, 2025

(54) EMULATION OF SPATIALLY DISTRIBUTED OBJECTS WITH A SPARSELY POPULATED ARRAY OF RADAR TARGET SIMULATORS

(71) Applicant: Keysight Technologies, Inc., Santa Rosa, CA (US)

(72) Inventors: Bernhard Holzinger, Baden Wuerttemberg (DE); Tom Vandeplas, Rotselaar (BE); Gregory S. Lee, Mountain View, CA (US); Karam Noujeim, Santa Clara, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 336 days.

(21) Appl. No.: 18/113,848

(22) Filed: Feb. 24, 2023

(65) Prior Publication Data
US 2024/0288545 A1  Aug. 29, 2024

(51) Int. Cl.
*G01S 7/40* (2006.01)
*G01S 13/931* (2020.01)

(52) U.S. Cl.
CPC .......... *G01S 7/4095* (2021.05); *G01S 7/4086* (2021.05); *G01S 13/931* (2013.01)

(58) Field of Classification Search
CPC ..................... G01S 7/40–4095; G01S 13/931
See application file for complete search history.

(56) References Cited

U.S. PATENT DOCUMENTS

| 4,613,863 A | 9/1986 | Mitchell |
| 4,660,041 A | 4/1987 | Maples et al. |
| 4,686,534 A | 8/1987 | Eddy |
| 4,737,792 A | 4/1988 | Grone |
| 5,117,230 A | 5/1992 | Wedel, Jr. |
| 5,177,488 A | 1/1993 | Wang et al. |
| 5,247,843 A | 9/1993 | Bryan |
| 5,431,568 A | 7/1995 | Fey et al. |

(Continued)

FOREIGN PATENT DOCUMENTS

| CN | 102928824 B | 1/2014 |
| CN | 204101724 U | 1/2015 |

(Continued)

OTHER PUBLICATIONS

Applicant-Initiated Interview Summary dated Oct. 11, 2023 for U.S. Appl. No. 17/175,761, 3 pgs.

(Continued)

*Primary Examiner* — Matthew M Barker

(57) ABSTRACT

A system for receiving a radar signal transmitted by a radar device under test (DUT) includes: a plurality of antennae disposed in an array of rows and columns; a plurality of radar target simulators (RTS's), one or more of the plurality of RTS's being selectively connected to each of rows or columns of the plurality of antennae. The plurality of antennae are adapted to receive signals selectively from the one or more RTS's connected to the column or row, and to transmit to the signals to the DUT. The system also includes a switching matrix adapted to selectively switch between selected antennae in each of the columns or each of the rows of the plurality of antennae to connect selected respective RTS's of the plurality of RTS's to selected active antennae of the plurality of antennae in a time division manner.

19 Claims, 7 Drawing Sheets

(56) References Cited

U.S. PATENT DOCUMENTS

| | | | |
|---|---|---|---|
| 5,457,463 | A | 10/1995 | Vencel et al. |
| 5,528,522 | A | 6/1996 | Delguerico |
| 5,892,479 | A | 4/1999 | Mills et al. |
| 6,067,041 | A | 5/2000 | Kaiser et al. |
| 6,075,480 | A | 6/2000 | Deliberis, Jr. |
| 6,114,985 | A | 9/2000 | Russell et al. |
| 6,218,989 | B1 | 4/2001 | Schneider et al. |
| 6,297,764 | B1 | 10/2001 | Wormington et al. |
| 6,384,771 | B1 | 5/2002 | Montague et al. |
| 6,496,139 | B1 | 12/2002 | Flacke et al. |
| 6,803,877 | B2 | 10/2004 | Ludewig et al. |
| 7,145,504 | B1 | 12/2006 | Newberg et al. |
| 8,334,803 | B1 | 12/2012 | Urkowitz |
| 9,151,828 | B2 | 10/2015 | Shipley |
| 9,581,683 | B2 | 2/2017 | Choi |
| 10,509,107 | B2 | 12/2019 | Heuel et al. |
| 10,527,715 | B2 | 1/2020 | Ahmed et al. |
| 11,415,668 | B2 | 8/2022 | Gruber et al. |
| 11,486,963 | B2 | 11/2022 | Kong |
| 11,520,008 | B2 | 12/2022 | Lee |
| 11,543,489 | B2 | 1/2023 | Lee |
| 2006/0267832 | A1 | 11/2006 | Newberg et al. |
| 2008/0018525 | A1 | 1/2008 | Svy et al. |
| 2008/0088501 | A1 | 4/2008 | Chandler |
| 2010/0109940 | A1 | 5/2010 | Williams |
| 2015/0219752 | A1 | 8/2015 | Lewis et al. |
| 2015/0364829 | A1 | 12/2015 | Tong et al. |
| 2015/0369905 | A1 | 12/2015 | Shipley |
| 2017/0010347 | A1 | 1/2017 | Schutte et al. |
| 2017/0115378 | A1 | 4/2017 | Haghighi et al. |
| 2017/0270376 | A1 | 9/2017 | Aina |
| 2019/0041496 | A1 | 2/2019 | Salvesen et al. |
| 2019/0391234 | A1 | 12/2019 | Gruber et al. |
| 2020/0019160 | A1 | 1/2020 | McArthur et al. |
| 2020/0110156 | A1 | 4/2020 | Ahmed et al. |
| 2020/0158823 | A1* | 5/2020 | Mikhailov .............. G01S 7/417 |
| 2020/0319325 | A1* | 10/2020 | Kong .................... G01S 7/4021 |
| 2021/0055384 | A1 | 2/2021 | Lee |
| 2021/0373122 | A1 | 12/2021 | Hamberger et al. |
| 2022/0021120 | A1 | 1/2022 | Montoya et al. |

FOREIGN PATENT DOCUMENTS

| | | |
|---|---|---|
| CN | 109459733 A | 3/2019 |
| CN | 112630733 A1 | 4/2021 |
| CN | 114258498 A | 3/2022 |
| DE | 102007002370 A1 | 7/2008 |
| DE | 102020212593 A1 | 4/2021 |
| JP | H07174840 A | 7/1995 |
| JP | 2001044748 A | 2/2001 |
| JP | 2005094440 A | 4/2005 |
| JP | 2008098919 A | 4/2008 |
| JP | 6264316 B2 | 1/2018 |
| JP | 2022018108 A | 1/2022 |
| KR | 10-2011-0069246 A | 6/2017 |
| KR | 10-2017-0103263 A | 9/2017 |
| KR | 10-2019-0123396 A | 11/2019 |
| WO | 2019/068126 A1 | 4/2019 |
| WO | 2021034357 A1 | 2/2021 |

OTHER PUBLICATIONS

"Radar Target Simulator, Direct Radar, 79 GHz", STR-773-12-D1, Eravant, Savage Millimeter, Inc., 2018, https://www.eravant.com/76-5-ghz-wr-12-dc-to-250-mhz-i-qfreq-30-db-carrier-rej-direct-reading-radar-target-simulator, pp. 1-2.

D Meena et al., "Design of Multilevel Radar Target Simulator," 2007 IEEE Radar Conference, pp. 203-208.

George E. Ponchak et al., "The Use of Metal Filled Via Holes for Improving Isolation in LTCC RF and Wireless Multichip Packages", IEEE Transactions on Advanced Packaging, vol. 23, No. 1, Feb. 2000, pp. 88-99.

David M. Pozar, "Considerations for Millimeter Wave Printed Antennas", IEEE Transactions on Antennas and Propagation, vol. AP-31, No. 5, Sep. 1983, pp. 740-747.

Werner Scheiblhofer et al.,"A Low-Cost Multi-Target Simulator for FMCW Radar System Calibration and Testing", Proceedings of the 47th European Microwave Conference, Oct. 10-12, 2017, Nuremberg, Germany, pp. 1191-1194.

"Direct Reading Radar Target Simulator", STR-773-12-D1, Eravant, Savage Millimeter, Inc., 2018, https://www.eravant.com/76-5-ghz-wr-12-dc-to-250-mhz-i-qfreq-30-db-carrier-rej-direct-reading-radar-target-simulator, pp. 1-2.

Kun Wei et al, "S-shaped periodic defected ground structures to reduce microstrip antenna array mutual coupling", Electronics Letters, Jul. 21, 2016, vol. 52, No. 15, pp. 1288-1290.

Fan Yang et al., "Microstrip Antennas Integrated With Electromagnetic Band-Gap (EBG) Structures: A Low Mutual Coupling Design for Array Applications", IEEE Transactions on Antennas and Propagation, vol. 51, No. 10, Oct. 2003, pp. 2936-2946.

Hussein Attia et al., "60 GHz PRGW Slot Antenna Array with Small Separation and Low Mutual Coupling", IEEE Global Symposium on Millimeter-Waves (GSMM), 2015, pp. 1-3.

Notice of Allowance dated Oct. 19, 2022, U.S. Appl. No. 16/867,804, 20 pgs.

Corrected Notice of Allowability dated Oct. 27, 2022, U.S. Appl. No. 16/867,804, 4 pgs.

Werner Scheiblhofer et al., "Low-cost Target Simulator for End-of-Line Tests of 24-GHz Radar Sensors", Warsaw Univ. of Technology, 2018, pp. 531-534.

Non-Final Office Action dated Jun. 28, 2022, for U.S. Appl. No. 16/867,804, 31 pgs.

Notice of Allowance dated Sep. 14, 2022, for U.S. Appl. No. 16/995,913, 17 pgs.

Notice of Allowance dated May 31, 2022, U.S. Appl. No. 16/995,913, 20 pgs.

International Search Report and Written Opinion for PCT Application No. PCT/US2020/031588 dated Aug. 21, 2020, 9 pgs.

Fraunhofer-Gesellschaft. Virtual tests for autonomous driving systems. Phys.erg [online], Apr. 1, 2019, https://phys.org/news/2019-04-virtual-autonomous.html, pp. 1-3.

English translation of CN102928824B, dated Jan. 8, 2014, 7 pgs.

David B. Rutledge et al, "Performance of a 100-element HBT grid amplifier", IEEE Transactions on Microwave Theory and Techniques, vol. 41 , No. 10, Oct. 1993, pp. 1762-1771.

Werner Scheiblhofer et al.,"A Low-Cost Multi-Target Simulator for FMCW Radar System Calibration and Testing" Proceedings of the 14th European Radar Conference, Oct. 11-13, 2017, Germany p. 343-346.

Non-Final Office Action dated Mar. 23, 2023, for U.S. Appl. No. 17/175,761, 34 pgs.

Non-Final Office Action dated Dec. 12, 2023, for U.S. Appl. No. 17/175,760, 48 pgs.

K. Siddiq et al., "On Phase Measurement in FMCW Radar Systems," 2017 Sensor Signal Processing for Defence Conference (SSPD), London, UK, 2017, Year: 2017, pp. 1-4.

Final Office Action dated Jun. 27, 2024, U.S. Appl. No. 17/157,160, 18 pgs.

Advisory Action dated Aug. 7, 2024, U.S. Appl. No. 17/157,160, 3 pgs.

Notice of Allowance dated Aug. 31, 2023, U.S. Appl. No. 17/175,761, 11 pgs.

English translation of CN204101724U, 4 pgs.

Michael Ernst Gadringer et al., "Radar target stimulation for automotive applications", IET Radar Sonar Navig., 2018, vol. 12 Iss. 10, pp. 1096-1103.

"Radar Scene Emulator", Keysight Technologies, Jun. 20, 2022, pp. 1-12.

* cited by examiner

EMULATION OF SPATIALLY DISTRIBUTED OBJECTS WITH A SPARSELY POPULATED ARRAY OF RADAR TARGET SIMULATORS

BACKGROUND

Advanced driver-assistance systems (ADASs) and autonomous driving systems for vehicles rely on detection and ranging systems that use detection and ranging electromagnetic signals, including millimeter wave radar signals, for example. The radar signals are used to warn of forward collisions and backward collisions, to implement adaptive cruise control and autonomous parking, for example, and ultimately to perform autonomous driving on streets and highways. ADASs are promising due to low cost, and the ability to operate at night or in inclement weather conditions (e.g., fog, rain, snow, dust).

Millimeter waves result from oscillations at frequencies in the frequency spectrum between 30 gigahertz (GHz) and 300 gigahertz. Millimeter wave (mmWave) automotive radar is a key technology for existing advanced driver-assistance systems (ADAS) and for planned autonomous driving systems. In addition to providing better angular resolution than comparatively longer wavelength (lower frequency) systems, adaptation of millimeter wave automotive radar has lowered costs to the point that millimeter wave automotive radar can now be deployed in large volumes. As a result, millimeter wave automotive radars are now widely used for long range, middle range and short range environment sensing in advanced driver-assistance systems. Additionally, millimeter wave automotive radars are likely to be widely used in autonomous driving systems currently being developed.

Actual driving environments in which automotive radars may be deployed can vary greatly and many such driving environments may be complex. For example, actual driving environments may contain numerous objects, and some objects encountered in actual driving environments have complicated reflection and diffraction characteristics that affect echo signals. The immediate consequences of incorrectly sensing and/or interpreting echo signals may be that false warnings or improper reactions are triggered or warnings or reactions that should be triggered are not, which in turn can lead to accidents.

Consequently, auto manufacturers and the automotive radar manufacturers are eager to electronically emulate driving conditions to provide automotive radar systems with optimally accurate performance.

While certain improvements have been realized in the emulation of driving conditions to test automotive radar systems, there is a need to provide systems that are less costly, while providing at least equal performance compared to more expensive systems.

What is needed, therefore, is a system and method for emulating a target encountered by a radar system that overcomes at least the drawbacks of the known radar emulators described above.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
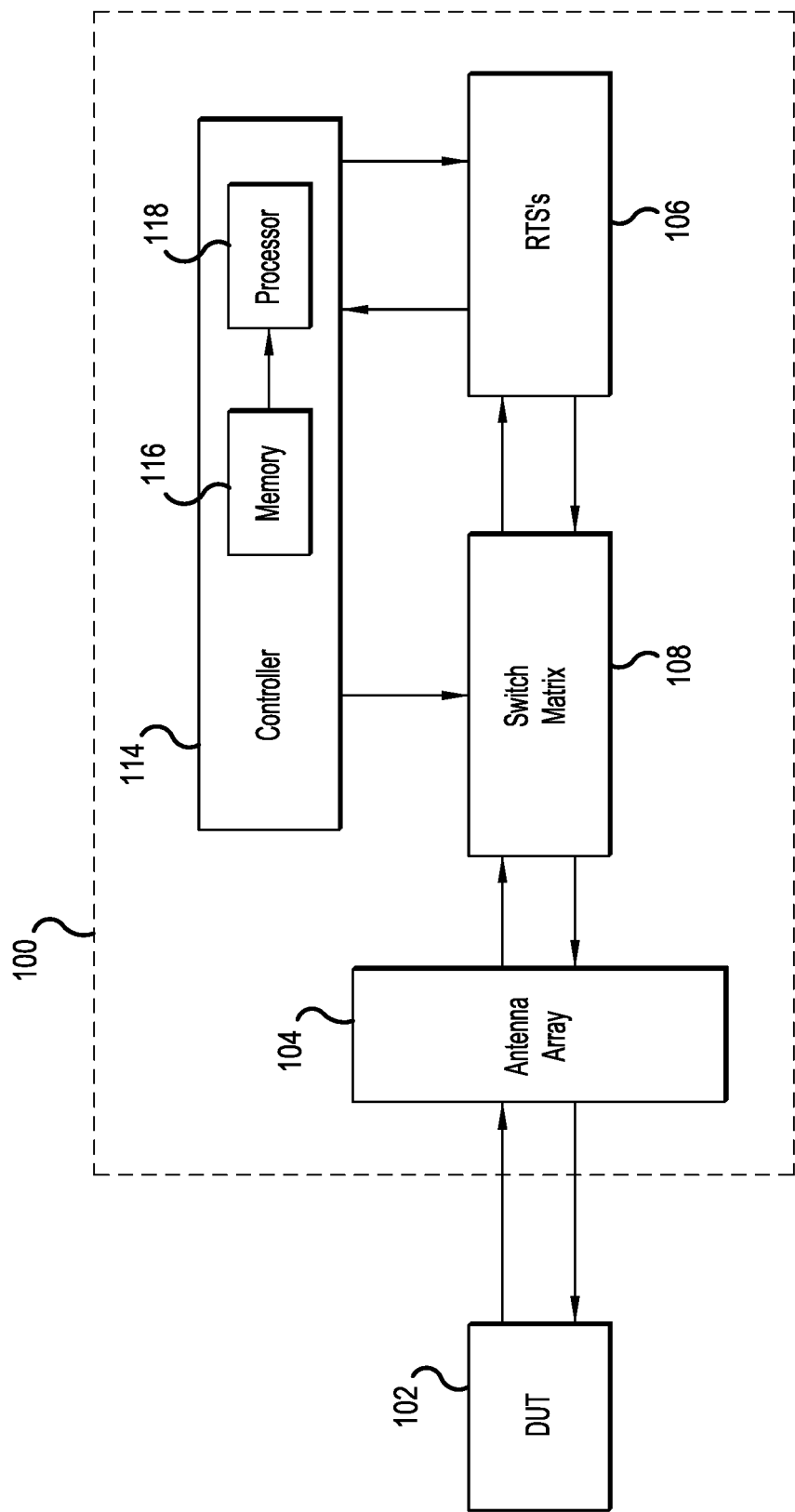
FIG. 1 is a simplified block diagram showing a system for emulating echo signals for a radar device under test (DUT) according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

In a general sense, the present teachings relate to scene simulation using ray tracing techniques to determine how radar would perceive a certain scene. This information is represented as point cloud where the points are representing return echoes that are mapped from active antennae. Each point is a scattering center and could also been seen as a miniature point target. The information attached with these points are the location of the point in space (e.g., having Cartesian coordinates x, y, z), where the emulated element also has an intensity value to account for the reflection intensity differences caused by different reflective surface and a Doppler shift to account for radial velocity. In the scene emulator of the present teachings the antennas are arranged in an array of multiple columns and rows. Unlike certain known radar testing systems, rather than each antenna being associated with one radar target simulator (RTS), only antennae that are active (as described more fully below) at a moment in time are used to emulate a scene. The RTS's thus emulate a distance, a radial velocity, and an intensity of a point being emulated to provide more realistic emulation of elements of a target and the target itself for the DUT. Moreover, and as described more fully below, an angular location of a more distant target is determined based on the antenna that is activated by the RTS.

The active antennae are the pixels used to emulate the scene. As a result, and as described more fully below, the ability to use fewer RTS's to emulate a scene of various representative embodiments reduces the overall complexity of the system and cost for testing radar. As described more fully below, each antenna is associated with a certain segment associated with one or more RTS's, where the field of view being covered by the scene emulator is divided into such segments (rows and columns of antennae that can be activated. Consequently, the number of RTS's is less than the number of antennae available in a segment for activation covered by the scene emulator).

From the location information of each point in a scene being emulated, the determination is made of which antenna needs to be activated to emulate this point. As described more fully below, a processor executes computer executable instructions to determine the location of each point to be simulated, and to assign each determined active antennae/RTS pair to emulate the desired points. Moreover, the processor executes instructions stored in memory to the selected RTS's to provide the intensity and other attributes of the particular point being emulated. In between the front end (antenna array) and the back end (RTS array) a switching matrix is provided to connect the desired antennae of the antenna array with the particular RTS's to effect the emulated elements of the scene at a particular moment in time.

In accordance with one aspect of the present teachings, a system for receiving a radar signal transmitted by a radar device under test (DUT) comprises: a plurality of antennae disposed in an array of rows and columns; a plurality of radar target simulators (RTS's), one or more of the plurality of RTS's being selectively connected to each of rows or columns of the plurality of antennae, wherein the plurality of antennae are adapted to receive signals selectively from the one or more RTS's connected to the column or row, and to transmit to the signals to the DUT; and a switching matrix adapted to selectively switch between selected antennae in each of the columns or each of the rows of the plurality of antennae to connect selected respective RTS's of the plurality of RTS's to selected active antennae of the plurality of antennae in a time division manner.

In accordance with another aspect of the present teachings a tangible, non-transitory computer readable medium stores instructions for use in a system for receiving a radar signal transmitted by a radar device under test (DUT) and transmitting an emulated echo signal reflected from an emulated target to the radar DUT in response to the radar signal. The system comprises: a plurality of antennae disposed in an array of rows and columns; a plurality of radar target simulators (RTS's), one or more of the plurality of RTS's being selectively connected to each of rows or columns of the plurality of antennae. The plurality of antennae are adapted to receive signals selectively from the one or more RTS's connected to the column or row, and to transmit to the signals to the DUT. The system also comprises a switching matrix. The instructions cause the processor to cause the switching matrix to: selectively switch between selected antennae in each of the columns or each of the rows of the plurality of antennae to connect selected respective RTS's of the plurality of RTS's to selected antennae of the plurality of antennae in a time division manner.

FIG. 1 is a simplified block diagram showing a system 100 for emulating echo signals for a radar DUT according to a representative embodiment. As will be appreciated by one of ordinary skill in the art having the benefit of the present disclosure, one likely vehicular radar is an automobile radar that is used in various capacities in current and emerging automobile applications. However, it is emphasized that the presently described system 100 for testing vehicular radar is not limited to automobile radar systems, and can be applied to other types of vehicles including busses, motorcycles, motorized bicycles (e.g., scooters), and other vehicles that could employ a vehicular radar system.

In accordance with a representative embodiment, the system 100 is arranged to test a radar device under test (DUT) 102. The system 100 comprises an antenna array 104, which comprises a plurality of antennae in rows and columns (not shown in FIG. 1).

The system 100 also comprises a plurality of RTS's 106 and a switch matrix 108 disposed between the plurality of RTS's and the antenna array 104. The system 100 also comprises a controller 114 comprising a memory 116 and a processor 118.

The switch matrix 108 is illustratively a hardware matrix comprising a plurality of switches to effect selective connections over time of selected antennae in the antenna array 104 to selected RTS's of the plurality of RTS's. As described more fully below, the memory 116 stores executable instructions (code), which when executed by the processor 118, causes the processor to connect and disconnect antenna/RTS combinations to carry out the emulation of targets in accordance with the present teachings. Moreover, and as noted below, a point cloud based on locations of an object being emulated may be stored in memory 116. As will become clearer as the present description continues, these locations are matched to an antenna of the antenna array at a particular moment in time to emulate the object at that moment in time.

The controller 114 may be implemented as a processing unit. In various embodiments, the processing function of the controller 114 may be carried out using one or more computer processors (e.g., processor 118), digital signal processors (DSP), field-programmable gate arrays (FPGAs), application specific integrated circuits (ASICs), or combinations thereof, using any combination of hardware, software, firmware, hard-wired logic circuits, or combinations thereof. The controller 114 may include its own processing memory (e.g., memory 116) for storing computer executable code (e.g., software, software modules) that enables performance of the various functions described herein. For example, the memory 116 may store software instructions/computer executable code executable by the processor for performing some or all aspects and details of methods described herein, including various steps of the methods of emulating targets described in connection with the representative embodiments of FIGS. 3 and 4. That is, execution of the instructions/computer executable code generally causes the processor 118 and/or the controller 114 to emulate echo signals reflected from emulated radar targets in response to the radar signals transmitted by the radar DUT 102. Memory 116 may be RAM, ROM, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), registers, a hard disk, a removable disk, tape, floppy disk, Blu-ray disk, or universal serial bus (USB) driver, or any other form of storage medium known in the art, which are tangible and non-transitory computer readable storage media (e.g., as compared to transitory propagating signals). Memories may be volatile or non-volatile, secure and/or encrypted, unsecure and/or unencrypted, without departing from the scope of the present teachings.

The system 100 also comprises a computer. The computer illustratively comprises a controller 114 described herein. The controller 114 described herein may include a combination a processor 118 and a memory 116 that stores instructions. The processor 118 executes the instructions in order to implement processes described herein. To this end, in addition to controlling the function of the radar DUT 102, in accordance with a representative embodiment, computer is adapted to control re-illuminator 101. As described more fully below, instructions stored in memory 116 are executed by the processor 118 to alter the signal strength (and thus power) of selected ones of the plurality of RTS's 106 by adjusting drive signals from the computer to the plurality of RTS's 106, with weaker drive signals providing comparatively weaker responsive emulation signals, and stronger drive signals providing comparatively stronger responsive emulation signals in accordance with the present teachings. Notably, however, in certain embodiments, emulation strengths (signal power) of RTS's 106 are adjusted by VGA's (variable gain amplifiers, not shown). This approach is preferable to lowering the magnitude of the desired stimulus signal by lowering the drive signals to the I-Q mixer, which strengthens the carrier frequency (as noted below), resulting in an undesirable ghost signal.

The controller 114 may be housed within or linked to a workstation such as the computer (not shown) or another assembly of one or more computing devices, a display/monitor, and one or more input devices (e.g., a keyboard, joysticks and mouse) in the form of a standalone computing system, a client computer of a server system, a desktop or a tablet. The term "controller" broadly encompasses all structural configurations, as understood in the art of the present disclosure and as exemplarily described in the present disclosure, of an application specific main board or an application specific integrated circuit for controlling an application of various principles as described in the present disclosure. The structural configuration of the controller may include, but is not limited to, processor(s), computer-usable/computer readable storage medium(s), an operating system, application module(s), peripheral device controller (s), slot(s) and port(s).

Additionally, although the computer may be shown as components networked together, two such components may be integrated into a single system. For example, the computer may be integrated with a display (not shown) and/or with the system 100. That is, in some embodiments, functionality attributed to the computer may be implemented by (e.g., performed by) the system 100. On the other hand, the networked components of the computer may also be spatially distributed such as by being distributed in different rooms or different buildings, in which case the networked components may be connected via data connections. In still another embodiment, one or more of the components of the computer is not connected to the other components via a data connection, and instead is provided with input or output manually such as by a memory stick or other form of memory. In yet another embodiment, functionality described herein may be performed based on functionality of the elements of the computer but outside the system 100.

The plurality of RTS's 106 are contemplated to be based on one or more of a number of known RTS's, with the omission of transmit (Tx) and receive (Rx) antennae as components of the individual RTS's. That is, and as alluded to above, many known RTS's are adapted to function as a point on an emulated target or as an emulated element target itself. This requires the use of an Rx antenna to receive the signal from the radar DUT, and the transmission of the return signal to the radar DUT after processing of the signal to emulate the characteristics of the particular point or element of the target being emulated. As such, each individual RTS functions as a pixel. As noted above, and as described more fully below, the RTS's are selectively connected to one or more antenna in a column or row of the antenna array 104, and each signal transmitted by the antennae paired with the RTS represents a pixel of an emulated target at a particular moment in time (e.g., 1 ms). The switch matrix then disconnects one or more of the active antennae in a column or row and engages another one (or more) active antenna in the column or row. Further details of aspects of the RTS's that comprise the plurality of RTS's may be found in commonly owned U.S. Pat. Nos. 11,520,008, 11,543,489, U.S. Patent Application Publication No. 20220260674, U.S. Patent Application Publication No. 20220171022, U.S. Patent Application Publication No. 20220018934, U.S. Patent Application Publication No. 20210406562, and International Patent Application Publication WO 2022164434A1. The entire disclosures of these U.S. Patents, U.S. Patent Application Publications and International Patent Application Publication are specifically incorporated herein by reference.

While the various components of the system 100 are described in greater detail in connection with representative embodiments below, a brief description of the function of the system 100 is presented currently. As described more fully below in connection with FIGS. 3-6, the plurality of RTS's 106 are selectively connected in a time division manner to antennae in the array to provide a point cloud over time to emulate a target, and to toggle between adjacent antenna to emulate a distant target. The selective connection provided by the switch matrix 108 allows the selective connection and disconnection of one or more RTS's to a column or a row of the plurality of antennae of the antenna array 104. Notably, while certain examples described below are provided to illustrate the selective connections of RTS's 106 in a time division manner, these are merely examples of how this can be carried. More generally, through execution of instructions (code) stored in memory 116 by the processor 118, the switch matrix 108 selectively connects RTS's 106 to antennae in the antenna array 104, with changes in switch connections occurring over time, and thus in a time division manner.

When connected to an RTS, an antenna of the antenna array 104 may be referred to as an active antenna. As will become clearer as the present description continues, the selective turning on and turning off of antennae of columns or rows of the antenna array 104 allows for the creation of the point cloud over a frame (sometimes referred to as a complete coherent processing interval (CPI)) typically comprising hundreds of chirps and having a length of about 20 ms. To this end, according to a representative embodiment, the active antennae are selectively engaged at a much faster rate than the duration of a frame. This allows for the emulation of a selected target (e.g., the side profile of a car) using a number of time slots that are comparatively short (e.g., 1 ms) and over which the emulated target does not move appreciably, if at all. As such, rather than having a single RTS for every element (pixel) of an emulated target as is done in known radar emulation systems, the presently described representative embodiment emulates the target over time through the selective activation and deactivation of antennae using RTS's that are selectively connected and disconnected to the antennae connected to the respective one or more RTS's in a column or row of the antenna array 104. As such, over time, the combination of antennae and RTS's is changed to effect the emulation of a target by the generation of a point cloud. Additionally, more distant targets may be emulated with better angular resolution according to a representative embodiment by the selective activating and deactivating of selected antenna in a row or column at a particular duty cycle to emulate a point between the selected antennae. Just by way of example, and as described more fully below in connection with FIG. 6, two adjacent antennae in a row of the antenna array 104 can be activated and deactivated in an alternating manner over time to emulate a target located between the two adjacent antenna in the row.

In operation, with reference to FIG. 1, the radar DUT 102 emits signals (illustratively millimeter wave signals) that are incident on the array of RTS's 106. As described more fully herein, the signals from the radar DUT 102 are selectively reflected with a timing and a power level adapted to emulate the distance, in both azimuth (±x-direction in the coordinate system of FIG. 1) and the elevation (±y direction in the coordinate system of FIG. 1) between each RTS 106 and the radar DUT 102. Notably, the respective focal points (alternatively foci) at each one of the receive antennae (not shown) represents a target that is emulated by the system 100.

The re-illuminated signals from RTS's 106 that receive signals from the radar DUT 102 are selectively altered by the RTS's 106 and transmitted back to the radar DUT 102. As described more fully below, the re-illuminated signals from the particular RTS's 106 of the re-illuminator 101 are received at the radar DUT 102 as emulated reflected signals from targets. The controller 114 receives the signals from the radar DUT 102 for further analysis of the accuracy of the radar DUT 102. Aspects and details of the RTS 106 described in connection with the representative embodiments may be common to the RTS's 106 and delay electronics described above, although they may not be repeated. Furthermore, various aspects and details of the RTS's 106 (sometimes referred to as MRD's, CMT's and pixels) may be similar to those described in commonly-owned U.S. patent application Ser. No. 17/157,160 filed on Jan. 25, 2021. The entire disclosure of U.S. patent application Ser. No. 17/157,160 is specifically incorporated herein by reference. Notably, some aspects and details of the RTS 106 may also be similar to those described in commonly-owned U.S. Provisional Application No. 62/912,442 filed on Oct. 9, 2019; commonly-owned U.S. patent application Ser. No. 16/867,804 filed on May 20, 2020; commonly owned U.S. Provisional Application No. 63/046,301 filed on Jun. 30, 2020; and commonly-owned International Application No. PCT/US21/15483 filed on Jan. 29, 2021. The entire disclosures of U.S. Provisional Application No. 62/912,442; U.S. patent application Ser. No. 16/867,804; U.S. Provisional Application No. 63/046,301; and commonly-owned International Application No. PCT/US21/15483 are specifically incorporated herein by reference. As will become clearer as the present description continues, aspects and details of the above-incorporated patent applications that relate to the use and function of a circulator, and a single antenna (for both reception and transmission of signals) in an RTS are not germane to the present teachings.

Figure 2:
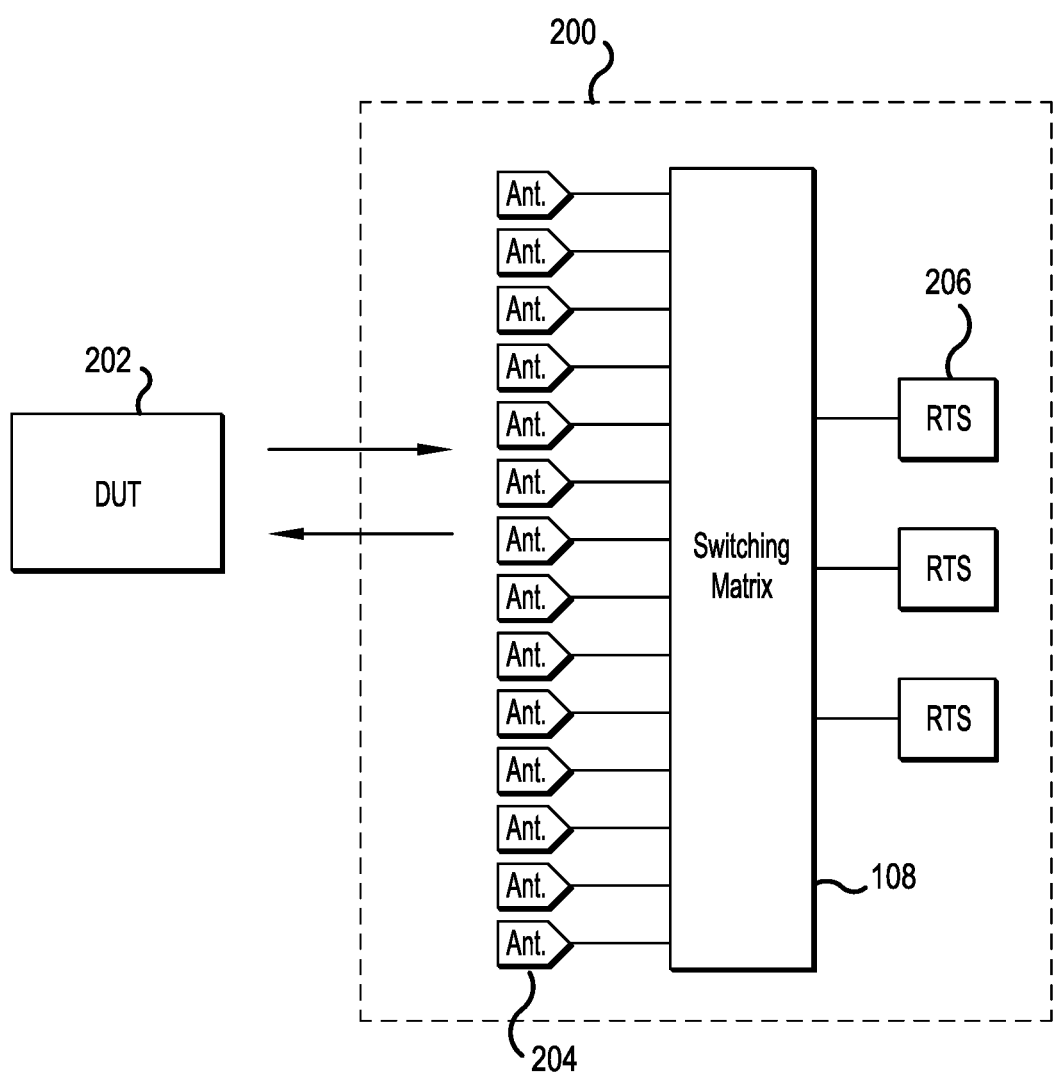
FIG. 2 is a simplified block diagram a column of antennae of an antenna array, a plurality of radar target simulators (RTS) and a switching matrix adapted to selectively connect the RTS's to the antennae of a system for emulating echo signals for a radar DUT, according to a representative embodiment.

FIG. 2 is a simplified block diagram of components a system 200 for testing radar devices comprising a column of antennae 204 of an antenna array, a plurality RTS's 206 and a switching matrix 208 adapted to selectively connect the RTS's 206 to the antennae of a system for emulating echo signals for a radar DUT, according to a representative embodiment. Various aspects and details of the system of FIG. 2 are common to those described above, and may not be repeated to avoid obscuring the presently described representative embodiments.

Notably, the column of antennae 204 are elements of an antenna array, which may comprise many columns of antennae (not shown the side view in FIG. 2) extending into the plane of the page. As such, not only are there columns extending into the plane of the page, but also a plurality of rows of antennae extending into the plane of the page. As will be appreciated, the present teachings are also adapted to assign a number of RTS's to a row, where again, the number of RTS's assigned to a particular row of RTS's is less than the number of antennae in the antenna array. The selective activation of antennae of a row as described herein for selected moments in time is also contemplated.

Based on control signals from the controller (not shown in FIG. 2), the switching matrix 208 is adapted selectively to connect the RTS's 206 to antennae of the column of antennae 204 as described above. In this representative embodiment, there are three RTS's 206 associated with fourteen (14) antennae of the column of antennae 204, and as noted above the number of RTS's is less than the number of antennae available in a segment for activation covered by the scene emulator. The location information of points in a scene being emulated by the column of antennae 204 is used to determination which antenna needs to be activated to emulate this point at a particular moment in time. As described more fully below, a processor (not shown in FIG. 2) executes computer executable instructions stored in memory (not shown in FIG. 2) to determine the location of each point to be simulated, and to assign each determined active antenna/RTS pair to emulate the desired points over time. As noted above, the active antennae of the column of antennae are adapted to change over time to effect emulation of the portion of the scene being emulated by the column of antennae 204 of the antenna array.

Figure 3:
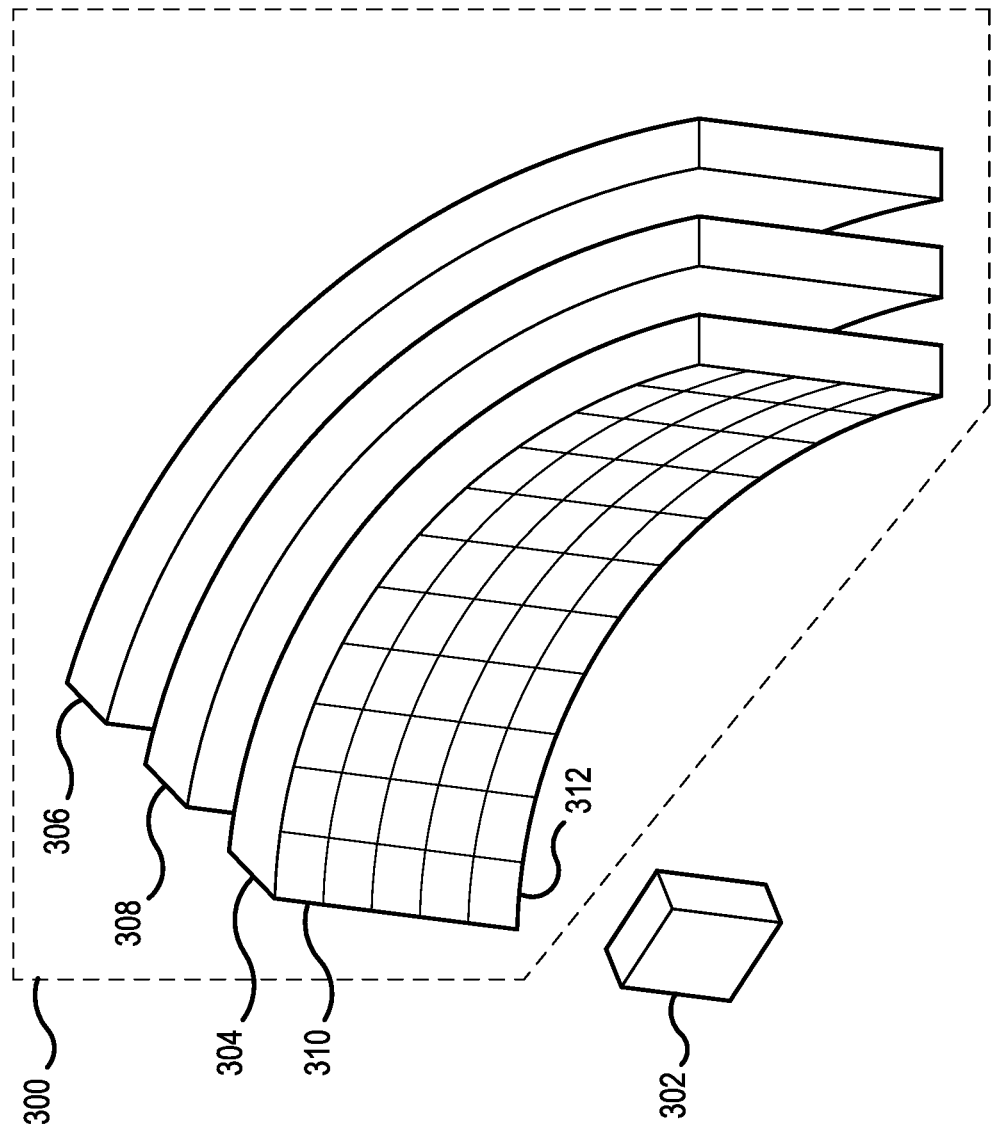
FIG. 3 is a perspective view of an antenna array, a plurality of radar target simulators (RTS) and a switching matrix adapted to selectively connect the RTS's to the antennae of a system for emulating echo signals for a radar DUT, according to a representative embodiment.

FIG. 3 is a perspective view of a system 300 for testing a radar device in accordance with a representative embodiment. Various aspects and details of the system of FIG. 3 are common to those described above, and may not be repeated to avoid obscuring the presently described representative embodiments.

The system comprises antenna array 304, a plurality of radar target simulators (RTS) 306 and a switching matrix 308 adapted to selectively connect the RTS's to the antennae of a system for emulating echo signals for a radar DUT, according to a representative embodiment.

The antenna array 304 comprises rows 310 that extend laterally from one side of the antenna array 304 to another, and columns 312 that extend from the top to the bottom of the antennae array. As noted above, the controller (not shown in FIG. 3) is adapted to assign a number of RTS's to each of the rows 310, where again, the number of RTS's assigned to a particular row of RTS's is less than the number of antennae in the antenna array. As such, the upon execution of instructions by the processor (not shown in FIG. 3) stored in the memory (not shown in FIG. 3), the selective activation of antennae of a row is effected herein for selected moments in time to emulate points of a target.

Based on control signals from the controller (not shown in FIG. 3), the switching matrix 308 is adapted selectively to connect the RTS's 306 to antennae of the column 312 of antennae as described above. In certain representative embodiments, a number of RTS's is assigned to each column 312 or each row 310 to selectively activate antennae of the column 312 or row 310 to emulate points of a target (not shown in FIG. 3) being emulated. Beneficially, the number of RTS's assigned to each column 312 or each row 310 is less than the number of antennae available in the column 312 or row 310 for activation covered by the scene emulator. The location information of points in a scene being emulated by the column/row of antenna array 304 is used to determination which antenna needs to be activated to emulate this point at a particular moment in time. As described more fully below, a processor (not shown in FIG. 3) executes computer executable instructions stored in memory (not shown in FIG. 3) to determine the location of each point to be simulated, and to assign each determined active antenna/RTS pair to emulate the desired points over time. As noted above, the active antennae of the column of antennae are adapted to change over time to effect emulation of the portion of the scene being emulated by the column of antennae 204 of the antenna array.

Figure 4:
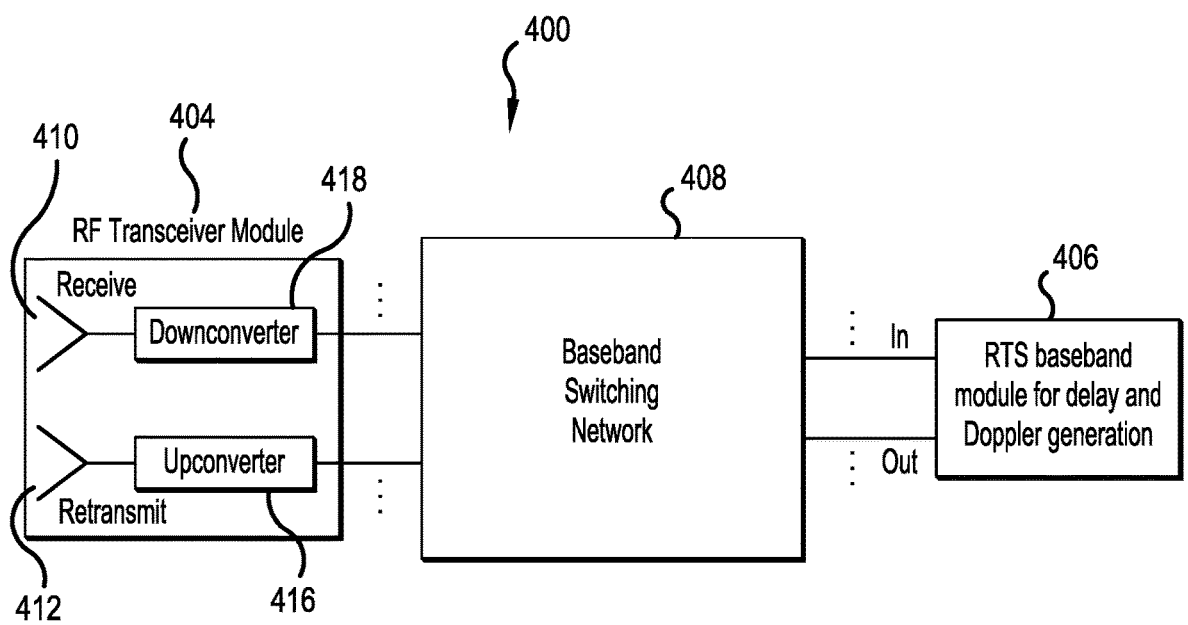
FIG. 4 is a simplified perspective view of an RF transceiver module an RTS baseband module and a baseband switching matrix adapted to selectively connect the RTS baseband module to the RF transceiver module of a system for emulating echo signals for a radar DUT, according to a representative embodiment.

FIG. 4 is a simplified block diagram of a system 400 for testing automotive radar in accordance with a representative embodiment. Various aspects and details of the system of FIG. 4 are common to those described above, and may not be repeated to avoid obscuring the presently described representative embodiments.

The system 400 comprises an RF transceiver module 404, an RTS baseband module 406 and a baseband switching matrix 408 adapted to selectively connect the RTS baseband module to the RF transceiver module of a system for emulating echo signals for a radar DUT (not shown in FIG. 4), according to a representative embodiment. Notably, FIG. 4 shows the connection of one RF transceiver module 404 via the switching matrix to RTS's (not shown in FIG. 4) assigned to the RF transceiver module 404. The RF transceiver module 404 may comprise one component of the antennae arrays described above. As such, rather than an array of antennae used to emulate targets/scenes for a DUT, an array of RF transceiver modules comprising a plurality of RF transceiver modules 404 arranged in rows and columns.

The RF transceiver module 404 comprises a receive antenna 410 adapted to receive radar signals from the radar DUT, and a transmit antenna 412 adapted to transmit signal processed in the RTS baseband module by one or more dedicated RTS's to provide emulated points back to the DUT. Alternatively, the transceiver module may comprise a single antenna (not shown) for both transmit and receive functions. In receive mode, the single antenna would be adapted to receive incoming radar signals and be connected to a frequency downconverter (described below); and in transmit mode the single antenna would be adapted to transmit outgoing radar signals (in this case echo signals) and be connected to a frequency upconverter (described below).

The receive antenna 410 is connected to a frequency down converter 418, which is adapted to down convert input signals from the radar at a comparatively high frequency (e.g., 77 GHz) to a lower (baseband) frequency (e.g., DC to 5 GHZ) before transmitting the received signal to the baseband switching matrix 408. As will be appreciated, implementing a switch matrix at the comparatively high frequency from the radar DUT would be inefficient and result in unacceptable power loss. The down conversion to the lower frequency thus allows for efficient transmission of the down converted signal from the RF transceiver module 404 to the baseband switching network and to the one or more assigned RTS's in the RTS baseband module for processing to alter the intensity, timing and Doppler shift of the received signal to emulate distance and radial velocity as described herein.

After the received signal is processed for the particular point of the emulated target, the baseband switching network transmits the processed signal from the assigned one or more RTS's to the RF transceiver module 404. After upconversion to the operating frequency of the radar DUT by a frequency upconverter 416, and transmission back to the DUT. This sequence is carried out for all RF transceiver modules as needed to emulate the desired number of points being emulated.

Figure 5:
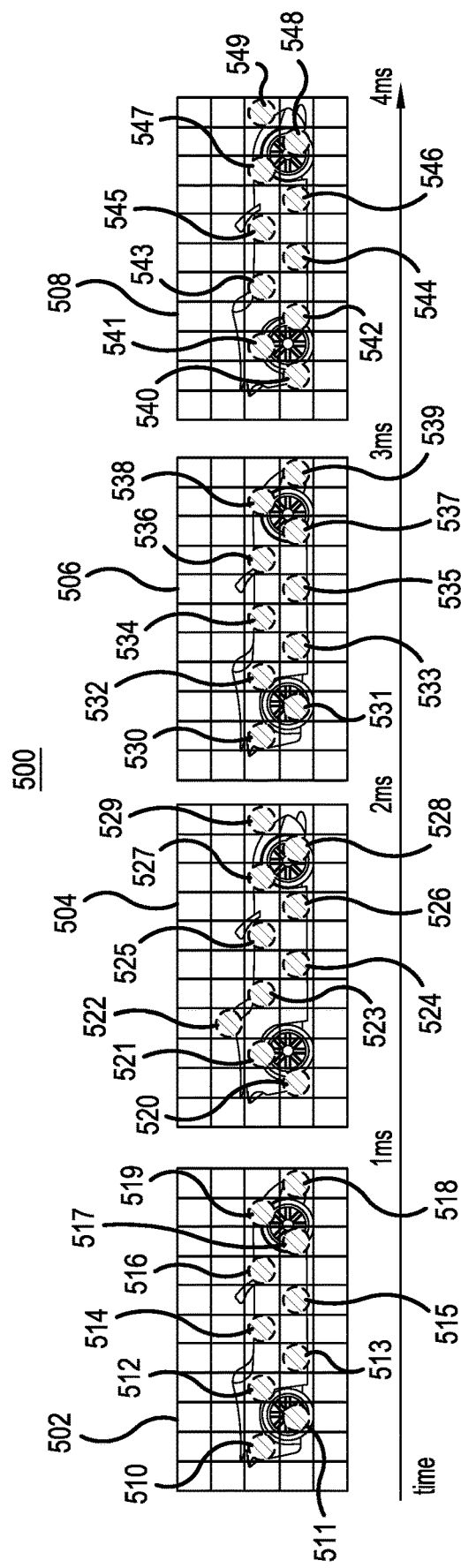
FIG. 5 is a simulation of an emulated target versus time according to a representative embodiment.

FIG. 5 is a simulation 500 of an emulated target versus time according to a representative embodiment. The representative embodiment of FIG. 5 is provided for illustrative purposes to describe operation in a time division manner. It is emphasized that the presently described representative embodiment is merely illustrative, and other embodiments consistent with the present teachings are contemplated.

Various aspects and details of the simulation of FIG. 5 are common to those described above, and may not be repeated to avoid obscuring the presently described representative embodiments.

As shown, there are first~fourth captured moments in time, 502, 504, 506, and 508. Each moment in time is separated by approximately 1 ms. Each of the depicted moments in time represent 11 columns of antennae of an antenna array according to the various representative embodiments discussed above. Notably, and as discussed above in connection with FIG. 4, each square of the 11 rows are contemplated to be individual RF transceiver modules 404 each comprising a receive antenna, a frequency downconverter, a transmit antenna and a frequency upconverter (not shown in FIG. 5) as discussed above.

At a first moment in time 502, active antennae are represented by shaded circles 510~519, with each active antenna being connected with an RTS (not shown in FIG. 5) through switches in a switch matrix (not shown in FIG. 5). Accordingly, in each column, one antenna is active at the captured moment in time. The location of the selected antenna element in each column at the particular moment in time is determined by the processor based on instructions stored in the memory to effect the emulation of the target (in this case a car). For example, in the first instant in time 502, shaded circles 510~519 correspond to 10 active antennae, where each column is adapted to have one active antenna at one moment in time. Stated somewhat differently, at the first moment in time 502, in each column there is one active antenna. This is also the case for the second~fourth moments in time 504~508: at each particular moment in time, each column has one active antenna in each column. Notably, the one moment/one active antenna/one column combination is merely illustrative, and the present teachings contemplate providing more than one active antenna in each column of the antenna array at a particular instant in time by the selective connection of RTS's to more than one antenna in a column based on the execution of instructions stored in memory by the processor.

Over the first~fourth captured moments in time, 502, 504, 506 and 508 by selectively switching different antennae to provide active antennae over time, the car is displayed. Just by way of example, the coordinates of each location of the car to be emulated in a look-up table stored in memory, the execution of instructions (computer executable code) in memory by the processor activates the selected antennae at each point/moment in time combination to provide the object being emulated (in this case the car) by signals that emulate echo signals back to the radar DUT (e.g., DUT 102). As such, the emulation of the object (car) described in connection with FIG. 5 is another example of connecting selected respective RTS's of the plurality of RTS's to selected active antennae of the plurality of antennae in a time division manner to emulate the object for the DUT.

As noted above, the connections at each active antenna in each column at the particular moment in time is carried out by pairing/connecting one antenna in each column of the 11 column array with a respective one RTS at the particular moment in time based on control signals provided to the switch matrix by the controller as described above and in accordance with a method described below. Of course, the controller also sets each RTS to provide the desired intensity, Doppler shift and delay of the signal transmitted back to the DUT to emulate the designated points of the emulated target at a particular moment in time.

By way of illustration, the instructions stored in memory and the point cloud based on locations stored in memory (e.g., in a look-up table) cause the processor to: pair the antenna at in the first column with the RTS assigned to the second column to activate the antenna of shaded circle 510; pair the antenna at in the third column with the RTS assigned to the third column to activate the antenna of shaded circle 511; pair the antenna at in the fourth column with the RTS assigned to the fourth column to activate the antenna of shaded circle 512; pair the antenna at in the fifth column with the RTS assigned to the fifth column to activate the antenna of shaded circle 513; pair the antenna at in the sixth column with the RTS assigned to the sixth column to activate the antenna of shaded circle 514; pair the antenna at in the seventh column with the RTS assigned to the seventh column to activate the antenna of shaded circle 515; pair the antenna at in the eight column with the RTS assigned to the eighth column to activate the antenna of shaded circle 516; pair the antenna at in the ninth column with the RTS assigned to the ninth column to activate the antenna of shaded circle 517; pair the antenna at in the tenth column with the RTS assigned to the tenth column to activate the antenna of shaded circle 518; and pair the antenna at in the eleventh column with the RTS assigned to the eleventh column to activate the antenna of shaded circle 519. Notably, the pairing of an antenna element of each column with a single RTS at a particular moment in time is merely illustrative, and there may be more RTS's associated with each column to effect the emulation of the target.

At the second moment in time 504, active antennae are represented by shaded circles 520~529. The instructions stored in memory and the point cloud based on locations stored in memory (e.g., the look-up table) cause the processor to: pair the antenna at in the first column with the RTS assigned to the second column to activate the antenna of shaded circle 520; pair the antenna at in the third column with the RTS assigned to the third column to activate the antenna of shaded circle 521; pair the antenna at in the fourth column with the RTS assigned to the fourth column to activate the antenna of shaded circle 522; pair the antenna at in the fifth column with the RTS assigned to the fifth column to activate the antenna of shaded circle 523; pair the antenna at in the sixth column with the RTS assigned to the sixth column to activate the antenna of shaded circle 524; pair the antenna at in the seventh column with the RTS assigned to the seventh column to activate the antenna of shaded circle 525; pair the antenna at in the eight column with the RTS assigned to the eighth column to activate the antenna of shaded circle 526; pair the antenna at in the ninth column with the RTS assigned to the ninth column to activate the antenna of shaded circle 527; pair the antenna at in the tenth column with the RTS assigned to the tenth column to activate the antenna of shaded circle 528; and pair the antenna at in the eleventh column with the RTS assigned to the eleventh column to activate the antenna of shaded circle 529. Notably, the pairing of an antenna element of each column with a single RTS at a particular moment in time is merely illustrative, and there may be more RTS's associated with each column to effect the emulation of the target.

Similarly, at the third moment in time 506, active antenna are represented by shaded circles 530~539. The instructions stored in memory and the point cloud based on locations stored in memory (e.g., the look-up table) cause the processor to: pair the antenna at in the first column with the RTS assigned to the second column to activate the antenna of shaded circle 530; pair the antenna at in the third column with the RTS assigned to the third column to activate the antenna of shaded circle 531; pair the antenna at in the fourth column with the RTS assigned to the fourth column to activate the antenna of shaded circle 532; pair the antenna at in the fifth column with the RTS assigned to the fifth column to activate the antenna of shaded circle 533; pair the antenna at in the sixth column with the RTS assigned to the sixth column to activate the antenna of shaded circle 534; pair the antenna at in the seventh column with the RTS assigned to the seventh column to activate the antenna of shaded circle 535; pair the antenna at in the eight column with the RTS assigned to the eighth column to activate the antenna of shaded circle 536; pair the antenna at in the ninth column with the RTS assigned to the ninth column to activate the antenna of shaded circle 537; pair the antenna at in the tenth column with the RTS assigned to the tenth column to activate the antenna of shaded circle 538; and pair the antenna at in the eleventh column with the RTS assigned to the eleventh column to activate the antenna of shaded circle 539. Notably, the pairing of an antenna element of each column with a single RTS at a particular moment in time is merely illustrative, and there may be more RTS's associated with each column to effect the emulation of the target.

Similarly, at the fourth moment in time 508 and at the fourth moment in time, active antenna are represented by shaded circles 540–549. The instructions stored in memory and the point cloud based on locations stored in memory (e.g., the look-up table) cause the processor to: pair the antenna at in the first column with the RTS assigned to the second column to activate the antenna of shaded circle 540; pair the antenna at in the third column with the RTS assigned to the third column to activate the antenna of shaded circle 541; pair the antenna at in the fourth column with the RTS assigned to the fourth column to activate the antenna of shaded circle 542; pair the antenna at in the fifth column with the RTS assigned to the fifth column to activate the antenna of shaded circle 543; pair the antenna at in the sixth column with the RTS assigned to the sixth column to activate the antenna of shaded circle 544; pair the antenna at in the seventh column with the RTS assigned to the seventh column to activate the antenna of shaded circle 545; pair the antenna at in the eight column with the RTS assigned to the eighth column to activate the antenna of shaded circle 546; pair the antenna at in the ninth column with the RTS assigned to the ninth column to activate the antenna of shaded circle 547; pair the antenna at in the tenth column with the RTS assigned to the tenth column to activate the antenna of shaded circle 548; and pair the antenna at in the eleventh column with the RTS assigned to the eleventh column to activate the antenna of shaded circle 549. Notably, the pairing of an antenna element of each column with a single RTS at a particular moment in time is merely illustrative, and there may be more RTS's associated with each column to effect the emulation of the target.

As will be appreciated, the switching of the active antenna in the eleven columns over time enable the emulation of the entire target over a 4 ms interval. Notably, for ease of illustration, presently described illustrative embodiment assumes the object (the car) not to be moving object. However, emulating the object as being in motion can be carried out through the proper combination of active antennae/locations of the components of the object at the specific time.

As will be appreciated, during the 4 ms duration of the target emulated in FIG. 5, the target is assumed not to move appreciably. The sequence shown in FIG. 5 is repeated with the selective turning on and turning off of antennae of columns or rows of the antenna array 104 that results in the creation of the point cloud over a frame/CPI to emulate the target (and any movement thereof) being emulated.

Figure 6:
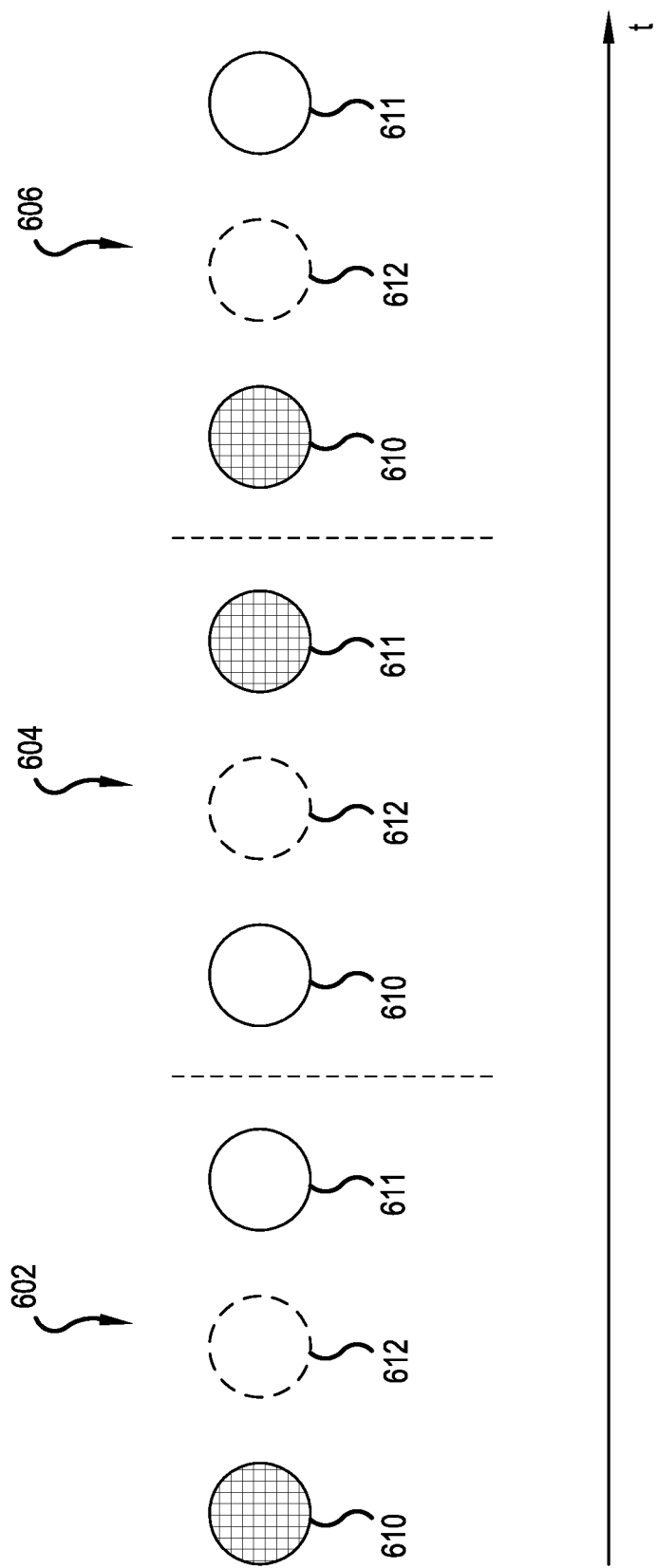
FIG. 6 is a simulation of emulation of an object between two targets at a distance from a DUT according to a representative embodiment.

FIG. 6 is a simulation of emulation of an object between two antenna at a distance from a DUT according to a representative embodiment. The representative embodiment of FIG. 6 is provided for illustrative purposes to describe another operation in a time division manner. It is emphasized that the presently described representative embodiment is merely illustrative, and other embodiments consistent with the present teachings are contemplated.

Various aspects and details of the emulation of the object of FIG. 6 are common to those described above, and may not be repeated to avoid obscuring the presently described representative embodiments.

FIG. 6 shows a first location 610 and a second location 611 at a first moment in time 602. The first and second locations are illustratively antennae or RF transceiver modules as described above. The first location 610 and the second location 611 are adapted to emulate an object at a significant distance from the radar DUT.

At the first moment in time 602, the first location 610 is illuminating, and as such the antenna/RF transceiver module associated with that location in space is active. At this moment in time, the second location is not illuminated, and the antenna/RF transceiver module associated with that location in space is not active.

At second moment in time 604, the second location 611 is illuminating, and as such the antenna/RF transceiver module associated with that location in space is active. At this moment in time, the first location is not illuminated, and the antenna/RF transceiver module associated with that location in space is not active.

At a third moment in time 606 the first location 610 is illuminating, and as such the antenna/RF transceiver module associated with that location in space is active. At this moment in time, the second location is not illuminated, and the antenna/RF transceiver module associated with that location in space is not active.

The toggling of the first and second locations 610, 612 to be alternatively illuminating in time results in emulation of a third location 611 disposed between the first and second locations. This results in an emulation of an object between at the third location. In the representative embodiment, the duty cycle of the toggle is 50%, and the third location 611 is disposed equidistant from the first and second locations 610, 612. Changing the duty cycle so that one antenna/RF transceiver module of one location is active at a greater frequency or time period results in the emulation of the third location 611 closer to the first or second location 610, 612 that is more active. Moreover, because the toggling between first and second locations 610, 612 (and thus by the selective connection over time to provide active antennae at first and second location in a time dependent manner) occurs multiple times during a CPI, the DUT perceives an average the angular location of the target over time. This results in a position (e.g., third location) in between the antennae being controlled by the duty cycle. Moreover, this toggling (and resultant dithering) is another example of connecting selected respective RTS's of the plurality of RTS's to selected active antennae of the plurality of antennae in a time division manner.

Figure 7:
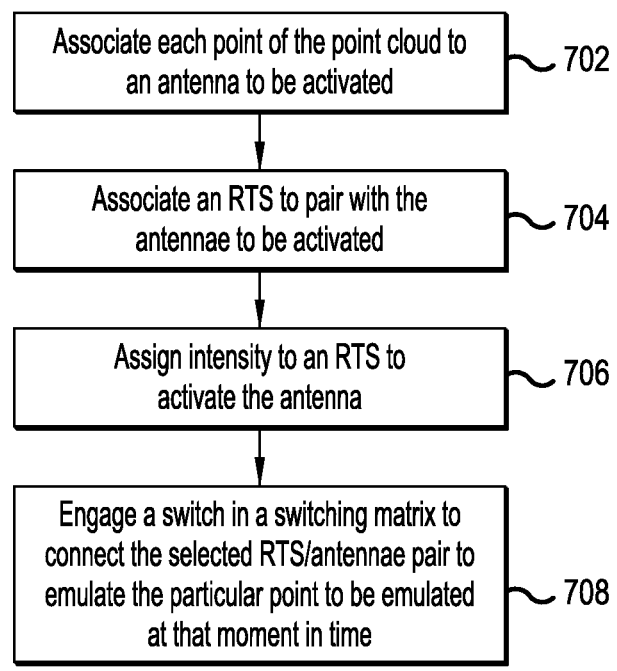
FIG. 7 is flow chart of a method of emulating a scene for an automotive radar DUT according to a representative embodiment.

FIG. 7 is flow chart of a method 700 of emulating a scene for an automotive radar DUT according to a representative embodiment. Various aspects and details and details of the method of FIG. 7 are common to those described above, and may not be repeated to avoid obscuring the presently described representative embodiments.

Notably, the memory 116 of the controller 114 stores instructions (computer executable code), which when executed by the processor 118 carries out the method 700 in the systems described above.

At 702, the method begins with the associating each point of a point cloud to an antenna to be activated. Notably, for each location of an object or component thereof being emulated, the location of the object or component is matched to one of the antennae/RF transceiver module at that location.

At 704, the method 700 continues with the associating of one or more of the RTS's with each antenna/RF transceiver module that needs to be activated. This pairing is effected for all needed antenna/RF transceiver module at a particular moment in time, and is carried out by execution of instructions by the processor 118 to connect switches of the switch matrix 108 between the paired antenna/RF transceiver module needed to emulate the object or portion thereof at a particular moment in time. Just by way of example, referring again to FIG. 5, the processor 118 is caused by the instructions stored in memory 116 to connect the necessary switch of the switch matrix 108 between the paired antenna/RF transceiver module to activate the paired antenna/RF transceiver module needed to provided shaded circle 511.

At 706 the method 700 comprises assigning intensity and delay values to the RTS to activate each particular antenna/RF transceiver module needed to emulate the object or portion of the object at the particular moment in time. The selection of intensity and delay needed to emulate a particular object or component of an object that is being emulated is carried out by execution of instructions stored in memory 108 by the processor 118.

At 708, a switch is engaged in the switching matrix to connect each selected RTS/antenna (or RF transceiver module) pair to emulate a particular point of an object or the object to be emulated at that moment in time.

The method begins again at 702 to emulate other points/objects to be emulated at the next particular moment in time.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects and details of the present teachings may be embodied as an apparatus, method or computer program product. Accordingly, aspects and details of the present invention may take the form of an entirely hardware embodiment, an entirely software embodiment (including firmware, resident software, micro-code, etc.) or an embodiment combining software and hardware aspects and details that may all generally be referred to herein as a "circuit," "module" or "system." Furthermore, aspects and details of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

We claim:

1. A system for receiving a radar signal transmitted by a radar device under test (DUT), and transmitting an emulated echo signal reflected from an emulated target to the radar DUT in response to the radar signal, the system comprising:
a plurality of antennae disposed in an array of rows and columns;
a plurality of radar target simulators (RTS's), one or more of the plurality of RTS's being selectively connected to each of rows or columns of the plurality of antennae, wherein the plurality of antennae are adapted to receive signals selectively from the one or more RTS's connected to the column or row, and to transmit the signals to the DUT; and
a switching matrix adapted to selectively switch between selected antennae in each of the columns or each of the rows of the plurality of antennae to connect selected respective RTS's of the plurality of RTS's to selected active antennae of the plurality of antennae in a time division manner.

2. The system of claim 1, wherein two or more of the plurality of antennae of a row or column are actively connected to only one of the RTS's at a time.

3. The system of claim 1, wherein two or more of the plurality of antennae are actively connected to two or more of the RTS's at a time.

4. The system of claim 1, wherein each of the plurality of RTS's is not adapted to connect to each of the plurality of antennae.

5. The system of claim 1, wherein a number of RTS's actively connected to a row or a column is less than a number of the plurality of antennae in the column or in the row.

6. The system of claim 5, wherein each of the RTS's is adapted to transmit signals from a single column of the array but not all columns of the array or a single row of the array but not all rows of the array.

7. The system of claim 1, wherein each of the plurality of RTS's is adapted to transmit signals to a selected one or more of the plurality of antennae in one time interval, and to transmit signals to another selected one or more of the plurality of antennae in another time interval.

8. The system of claim 1, further comprising a controller adapted to activate the number of RTS's to transmit the signals, and to cause the switching matrix to selectively connect the selected RTS's of the plurality of RTS's to selected antennae of the plurality of antennae.

9. The system of claim 8, wherein the controller is further adapted to set a power level of the activated RTS's to emulate various degrees of reflectance to the DUT.

10. The system of claim 1, wherein a selected number of antennae of the array are selected by the switching matrix to connect selected ones of the plurality of RTS's to emulate a target by changing active connections to the selected number of antennae over time.

11. A tangible, non-transitory computer readable medium that stores instructions for use in a system for receiving a radar signal transmitted by a radar device under test (DUT), and transmitting an emulated echo signal reflected from an emulated target to the radar DUT in response to the radar signal, the system comprising:

a plurality of antennae disposed in an array of rows and columns;

a plurality of radar target simulators (RTS's), one or more of the plurality of RTS's being selectively connected to each of rows or columns of the plurality of antennae, wherein the plurality of antennae are adapted to receive signals selectively from the one or more RTS's connected to the column or row, and to transmit the signals to the DUT; and a switching matrix, wherein the instructions cause the processor to cause the switching matrix to:

selectively switch between selected antennae in each of the columns or each of the rows of the plurality of antennae to connect selected respective RTS's of the plurality of RTS's to selected antennae of the plurality of antennae in a time division manner.

12. The tangible, non-transitory computer readable medium of claim 11, wherein the instructions further cause two or more of the plurality of antennae of a row or a column to be actively connected to only one of the RTS's at a time.

13. The tangible, non-transitory computer readable medium of claim 11, wherein the instructions further cause two or more of the plurality of antennae of a row or a column to be actively connected to two or more of the RTS's at a time.

14. The tangible, non-transitory computer readable medium of claim 11, wherein the instructions do not cause each of the plurality of RTS's to be connected to each of the plurality of antennae.

15. The tangible, non-transitory computer readable medium of claim 11, wherein a number of RTS's actively connected to a row or a column is less than a number of the plurality of antennae in the column or in the row.

16. The tangible, non-transitory computer readable medium of claim 11, wherein the instructions further cause the RTS's to transmit signals from a single column of the array but not all columns of the array or a single row of the array but not all rows of the array.

17. The tangible, non-transitory computer readable medium of claim 11, wherein the instructions further cause each of the plurality of RTS's to transmit signals to a selected one or more of the plurality of antennae in one time interval, and to transmit signals to another selected one or more of the plurality of antennae in another time interval.

18. The tangible, non-transitory computer readable medium of claim 11, wherein the instructions further cause the processor to set a power level of the activated RTS's to emulate various degrees of reflectance to the DUT.

19. The tangible, non-transitory computer readable medium of claim 11, wherein the instructions further cause the processor to cause the switching matrix to connect a selected number of antennae of the array to selected ones of the plurality of RTS's to emulate a target by changing active connections to the selected number of antennae over time.

* * * * *